(12) United States Patent
Andrianov et al.

(10) Patent No.: US 10,846,128 B2
(45) Date of Patent: Nov. 24, 2020

(54) MANAGING THE GRACEFUL TERMINATION OF A VIRTUALIZED NETWORK FUNCTION INSTANCE

(71) Applicant: NOKIA SOLUTIONS AND NETWORKS OY, Espoo (FI)

(72) Inventors: Anatoly Andrianov, Schaumburg, IL (US); Gyula Bodog, Budapest (HU); Uwe Rauschenbach, Poing (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 117 days.

(21) Appl. No.: 15/765,321

(22) PCT Filed: Oct. 2, 2015

(86) PCT No.: PCT/US2015/053754
§ 371 (c)(1),
(2) Date: Apr. 2, 2018

(87) PCT Pub. No.: WO2017/058251
PCT Pub. Date: Apr. 6, 2017

(65) Prior Publication Data
US 2018/0253332 A1 Sep. 6, 2018

(51) Int. Cl.
*G06F 9/48* (2006.01)
*G06F 9/455* (2018.01)
(Continued)

(52) U.S. Cl.
CPC .......... *G06F 9/485* (2013.01); *G06F 9/45558* (2013.01); *H04L 12/4641* (2013.01);
(Continued)

(58) Field of Classification Search
CPC ................. G06F 9/485; G06F 9/45558; G06F 2009/45575; G06F 2009/45595; H04L 41/06; H04L 41/08
See application file for complete search history.

(56) References Cited

U.S. PATENT DOCUMENTS 8,661,131 B1 2/2014 Yemini et al.
2006/0026590 A1 2/2006 Berenberg et al.
(Continued)

FOREIGN PATENT DOCUMENTS

WO 2015113278 A1 8/2015
WO 2016048430 A1 3/2016

OTHER PUBLICATIONS

International Search Report & Written Opinion dated Jan. 11, 2016 corresponding to International Patent Application No. PCT/US2015/053754.
(Continued)

*Primary Examiner* — Arvin Eskandarnia
(74) *Attorney, Agent, or Firm* — Squire Patton Boggs (US) LLP

(57) ABSTRACT

The present invention provides apparatuses, methods, computer programs, computer program products and computer-readable media regarding managing the graceful termination of a virtualized network function (VNF) instance. The method comprises receiving a request for a graceful termination of a virtual network function instance, transmitting the request for the graceful termination of the virtual network function instance to an element manager, checking, whether a confirmation that the virtual network function instance to be terminated has been taken out of service, is received, and if the confirmation is received, terminating the virtual network function instance.

19 Claims, 13 Drawing Sheets

(51) Int. Cl.
*H04L 12/46* (2006.01)
*H04L 12/24* (2006.01)

(52) U.S. Cl.
CPC ............ *H04L 41/064* (2013.01); *H04L 41/08* (2013.01); *G06F 2009/45575* (2013.01); *G06F 2009/45595* (2013.01)

(56) References Cited

U.S. PATENT DOCUMENTS

| | | | |
|---|---|---|---|
| 2011/0302496 | A1 | 12/2011 | Pugaczewski et al. |
| 2013/0150126 | A1 | 6/2013 | Pattaswamy et al. |
| 2013/0166716 | A1 | 6/2013 | Safari et al. |
| 2014/0351446 | A1* | 11/2014 | Cho ........................ H04L 65/80 709/227 |
| 2016/0337172 | A1 | 11/2016 | Yu et al. |
| 2017/0244596 | A1* | 8/2017 | Chen .................. H04L 12/1407 |
| 2017/0257276 | A1* | 9/2017 | Chou .................. H04L 41/0896 |
| 2018/0367372 | A1* | 12/2018 | Chou .................. H04L 41/5009 |

OTHER PUBLICATIONS

Antonio Gamelas, "Specification of the Infrastructure Virtualisation, Management and Orchestration—Interim," Sep. 30, 2014, Retrieved from http://www.t-nova.eu/wp-content/uploads/2014/12/TNOVA_D2.31_Spec_of_IVM_and_Orchestrator_I.pdf.

ETSI, "Network Functions Virtualisation (NFV); Virtual Network Functions Architecture," ETSI GS NFV-SWA 001 v1.1.1 (Dec. 2014), Group Specification, Dec. 2014.

Intel et al., "Removing MME VNF from the MME pool procedure," 3GPP; S5-154150, 3GPP TSG SA WG5 (Telecom Management) Meeting #102, Beijing, China, Aug. 24-28, 2015.

ETSI, "Network Functions Virtualisation (NFV); Management and Orchestration," ETSI GS NFV-MAN 001 v1.1.1 (Dec. 2014), Group Specification, Dec. 2014.

ETSI, "Network Functions Virtualisation (NFV); Terminology for Main Concepts in NFV," ETSI GS NFV 003 V1.2.1 (Dec. 2014), Group Specification, Dec. 2014.

May 23, 2019 Office Action issued in European Patent Application No. 15905629.0.

European Office Action corresponding to EP Application No. 15 905 629.0, dated Apr. 23, 2020.

* cited by examiner

MANAGING THE GRACEFUL TERMINATION OF A VIRTUALIZED NETWORK FUNCTION INSTANCE

FIELD OF THE INVENTION

The present invention relates to apparatuses, methods, systems, computer programs, computer program products and computer-readable media for managing the graceful termination of a virtualized network function (VNF) instance.

ABBREVIATIONS/GLOSSARY

In the description of the present invention, the following expressions may be used as defined in document [1].
BSS Business Support System
EM Element Manager
ETSI European Telecommunications Standards Institute
FCAPS Fault, Configuration, Accounting, Performance and Security Management
NFV Network Functions Virtualization
NFV-MANO NFV Management and Orchestration
NFVO Network Functions Virtualization Orchestrator
NM Network Manager
OSS Operations Support System
REST Representational State Transfer
VIM Virtualized Infrastructure Manager
VM Virtual Machine
VNF Virtualized Network Function
VNFM Virtualized Network Function Manager Network Function (NF): functional block within a network infrastructure that has well-defined external interfaces and well-defined functional behavior. In practical terms, a Network Function is today often a network node or physical appliance.

Network Functions Virtualization (NFV): principle of separating network functions from the hardware they run on by using virtual hardware abstraction Network Functions Virtualization Infrastructure (NFVI): totality of all hardware and software components that build up the environment in which VNFs are deployed. The NFV-Infrastructure can span across several locations, e.g. places where data centers are operated. The network providing connectivity between these locations is regarded to be part of the NFV-Infrastructure. NFV-Infrastructure and VNF are the top-level conceptual entities in the scope of Network Functions Virtualization. All other components are sub-entities of these two main entities.

Network Functions Virtualization Management and Orchestration (NFV-MANO): functions collectively provided by NFVO, VNFM, and VIM Network Functions Virtualization Orchestrator (NFVO): functional block that manages the Network Service (NS) lifecycle and coordinates the management of NS lifecycle, VNF lifecycle (supported by the VNFM) and NFVI resources (supported by the VIM) to ensure an optimized allocation of the necessary resources and connectivity.

Virtual Machine (VM): virtualized computation environment that behaves very much like a physical computer/server.

Virtual Network: virtual network routes information among the network interfaces of VM instances and physical network interfaces, providing the necessary connectivity. The virtual network is bounded by its set of permissible network interfaces.

Virtualized Infrastructure Manager (VIM): functional block that is responsible for controlling and managing the NFVI compute, storage and network resources, usually within one operator's Infrastructure Domain (e.g. NFVI-PoP).

Virtualized Network Function (VNF): implementation of an NF that can be deployed on a Network Function Virtualization Infrastructure (NFVI).

Virtualized Network Function Manager (VNFM): functional block that is responsible for the lifecycle management of VNF.

BACKGROUND OF THE INVENTION

The invention proposes a method for managing the graceful termination of a virtualized network function (VNF) instance in the Network Functions Virtualization (NFV) environment. The ETSI NFV architectural framework as defined in document [2] is shown in FIG. 1.

In NFV, multiple Virtualized Network Functions (VNFs) 11 are connected to realize Network Services (NSs). A VNF instance is composed of one or more software instances running in virtualized containers (such as virtual machines or Docker containers). A NS can scale with load, by adding VNF instances when the load is (expected to be) high (scale-out), and by removing VNF instances when the load is (expected to be) low (scale-in). There may also be other reasons for terminating a VNF, such as freeing resources for higher-priority services, or the execution of maintenance tasks. It is the task of the VNF Manager (VNFM) 12 to manage the lifecycle of the VNFs, including their termination. Typically, when the VNFM is instructed by an external entity such as the NFVO (NFV Orchestrator) 13 to terminate a VNF instance, that VNF instance is still participating in the NS, i.e. it is providing service. Terminating the VNF instance in that state would lead to service interruption for a number of customers. This is clearly undesired.

Document [3] discloses that the network management (NM) can take the responsibility to take VNF out of service prior to issuing a request for VNF instance termination.

REFERENCES

[1]: ETSI GS NFV 003 V1.2.1 (2014-12) Network Functions Virtualization (NFV); Terminology for Main Concepts in NFV
[2]: ETSI GS NFV-MAN 001 V1.1.1 (2014-12) Network Functions Virtualization (NFV); Management and Orchestration
[3]: S5-154150 (http://www.3gpp.org/ftp/tsg_sa/WG5_TM/TSGS5_102/Docs/S5-154150.zip).

SUMMARY OF THE INVENTION

It is therefore an object of the present invention to overcome the above mentioned problems and to provide apparatuses, methods, systems, computer programs, computer program products and computer-readable media for managing the graceful termination of a virtualized network function (VNF) instance.

According to an aspect of the present invention there is provided a method for use in a virtual network function manager comprising:
    receiving a request for a graceful termination of a virtual network function instance, transmitting the request for the graceful termination of the virtual network function instance to an element manager, checking, whether a confirmation that the virtual network function instance to be terminated has been taken out of service, is received, and if the confirmation is received, terminating the virtual network function instance.

According to an aspect of the present invention there is provided a method for use in an element manager, comprising:

receiving a request for a termination of a virtual network function instance from a virtualized network function manager, taking the virtual network function instance to be terminated out of service.

According to an aspect of the present invention there is provided a method for use in an element manager, comprising:

deciding to terminate a virtual network function instance, taking the virtual network function instance to be terminated out of service, transmitting a request for the termination of the virtual network function instance to a virtualized network function manager.

According to an aspect of the present invention there is provided a method for use in an entity within operations support system, comprising:

receiving a request for a termination of a virtual network function instance from a network functions virtualization orchestrator, evaluating the request for the termination of the virtual network function instance, if the request is approved, taking the virtual network function instance to be terminated out of service, and transmitting a confirmation that the virtual network function instance to be terminated has been taken out of service to the network functions virtualization orchestrator.

According to an aspect of the present invention there is provided a method for use in a network functions virtualization orchestrator, comprising:

deciding to terminate a virtual network function instance, transmitting a request for a graceful termination of a virtual network function instance to an entity within operations support system, receiving a confirmation that the virtual network function instance to be terminated has been taken out of service from the entity within the operations support system, and transmitting the request for the termination of the virtual network function instance to a virtualized network function manager.

According to an aspect of the present invention there is provided an apparatus for use in a virtual network function manager, comprising:

at least one processor, and at least one memory for storing instructions to be executed by the processor, wherein the at least one memory and the instructions are configured to, with the at least one processor, cause the apparatus at least to perform:

receiving a request for a graceful termination of a virtual network function instance, transmitting the request for the graceful termination of the virtual network function instance to an element manager, checking, whether a confirmation that the virtual network function instance to be terminated has been taken out of service, is received, and if the confirmation is received, terminating the virtual network function instance.

According to an aspect of the present invention there is provided an apparatus for use in an element manager, comprising:

at least one processor, and at least one memory for storing instructions to be executed by the processor, wherein the at least one memory and the instructions are configured to, with the at least one processor, cause the apparatus at least to perform:

receiving a request for a termination of a virtual network function instance from a virtualized network function manager, taking the virtual network function instance to be terminated out of service.

According to an aspect of the present invention there is provided an apparatus for use in an element manager, comprising:

at least one processor, and at least one memory for storing instructions to be executed by the processor, wherein the at least one memory and the instructions are configured to, with the at least one processor, cause the apparatus at least to perform:

deciding to terminate a virtual network function instance, taking the virtual network function instance to be terminated out of service, transmitting a request for the termination of the virtual network function instance to a virtualized network function manager.

According to an aspect of the present invention there is provided an apparatus for use in an entity within operations support system, comprising:

at least one processor, and at least one memory for storing instructions to be executed by the processor, wherein the at least one memory and the instructions are configured to, with the at least one processor, cause the apparatus at least to perform:

receiving a request for a termination of a virtual network function instance from a network functions virtualization orchestrator, evaluating the request for the termination of the virtual network function instance, if the request is approved, taking the virtual network function instance to be terminated out of service, and transmitting a confirmation that the virtual network function instance to be terminated has been taken out of service to the network functions virtualization orchestrator.

According to an aspect of the present invention there is provided an apparatus for use in a network functions virtualization orchestrator, comprising:

at least one processor, and at least one memory for storing instructions to be executed by the processor, wherein the at least one memory and the instructions are configured to, with the at least one processor, cause the apparatus at least to perform:

deciding to terminate a virtual network function instance, transmitting a request for a graceful termination of a virtual network function instance to an entity within operations support system, receiving a confirmation that the virtual network function instance to be terminated has been taken out of service from the entity within the operations support system, and transmitting the request for the termination of the virtual network function instance to a virtualized network function manager.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to a still further aspect of the present invention there is provided an apparatus comprising:

means for receiving a request for a graceful termination of a virtual network function instance, means for transmitting the request for the graceful termination of the virtual network function instance to an element manager, means for checking, whether a confirmation that the virtual network function instance to be terminated has been taken out of service, is received, and means for terminating the virtual network function instance, if the confirmation is received.

According to a still further aspect of the present invention there is provided an apparatus comprising:

means for receiving a request for a termination of a virtual network function instance from a virtualized network function manager, means for taking the virtual network function instance to be terminated out of service.

According to a still further aspect of the present invention there is provided an apparatus comprising:

means for deciding to terminate a virtual network function instance, means for taking the virtual network function instance to be terminated out of service, means for transmitting a request for the termination of the virtual network function instance to a virtualized network function manager.

According to a still further aspect of the present invention there is provided an apparatus comprising:

means for receiving a request for a termination of a virtual network function instance from a network functions virtualization orchestrator, means for evaluating the request for the termination of the virtual network function instance, if the request is approved, means for taking the virtual network function instance to be terminated out of service, and means for transmitting a confirmation that the virtual network function instance to be terminated has been taken out of service to the network functions virtualization orchestrator.

According to a still further aspect of the present invention there is provided an apparatus comprising:

means for deciding to terminate a virtual network function instance, means for transmitting a request for a graceful termination of a virtual network function instance to an entity within operations support system, means for receiving a confirmation that the virtual network function instance to be terminated has been taken out of service from the entity within the operations support system, and means for transmitting the request for the termination of the virtual network function instance to a virtualized network function manager.

Further aspects and features of the present invention are set out in the dependent claims.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
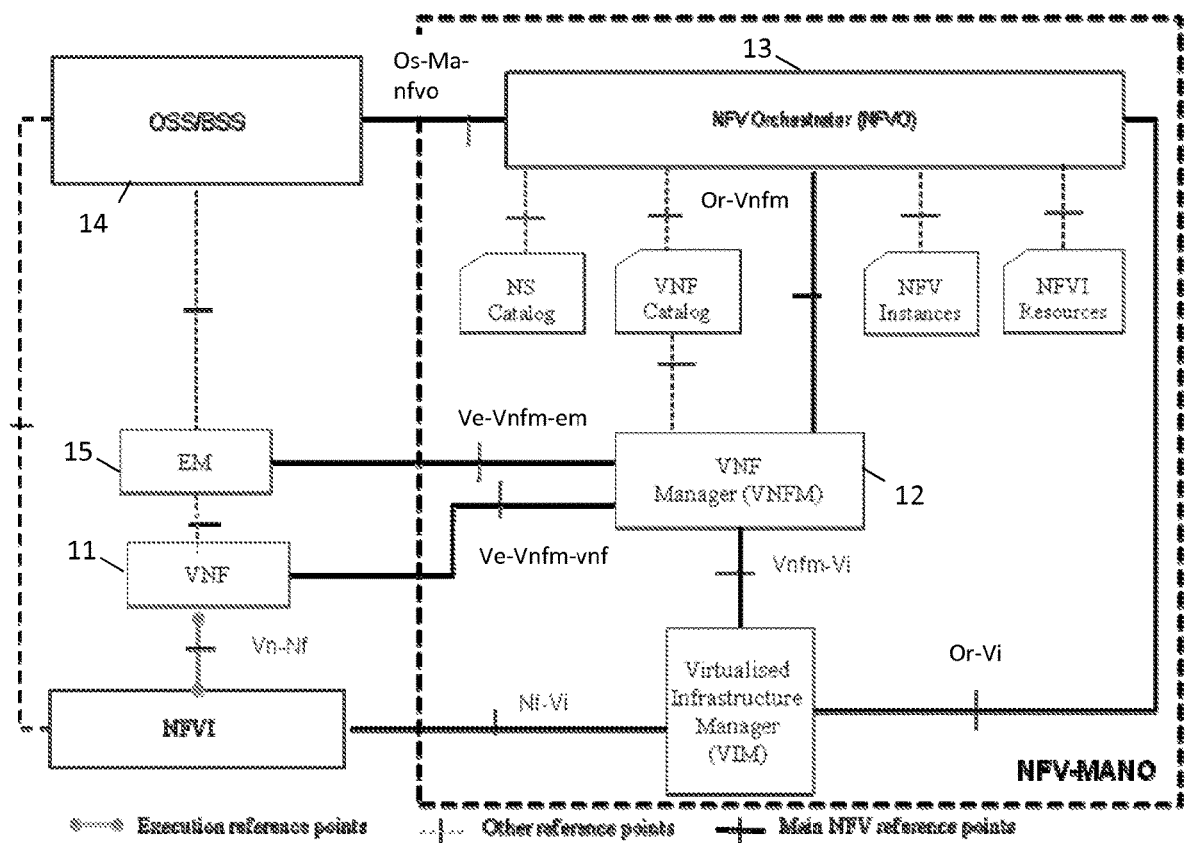
FIG. 1 is a diagram illustrating the ETSI NFV architectural framework.

In the following, some example versions of the disclosure and embodiments of the present invention are described with reference to the drawings. It is noted that the present invention is not limited to any particular Radio Access Technology (RAT) and is applicable to any domains (including those relevant for IT networks).

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, call signaling and media processing elements (e.g. virtualized Voice over LTE (VoLTE)/IP Multimedia Subsystem (IMS)), policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that any of the elements described in the present application or their functionalities may be implemented by using any node, host, server or access node etc. entity suitable for such a usage.

Furthermore, any of the described elements, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to certain aspects of the present invention, there is provided a solution for the termination problem that allows graceful termination of a VNF instance that minimizes service impact, as opposed to a forceful termination which will interrupt the service for all customers served by this VNF instance. The basic principle is that the management entities that are responsible for virtualization aspects (NFVO, VNFM) communicate with the management entities that are responsible for the management of the application (OSS, EM).

A graceful termination of a VNF instance avoids such adverse effects as described above by taking the VNF instance out of service before the resources it uses are terminated. Taking a VNF instance out of service typically involves application-layer steps such as the reconfiguration of the VNF instance to reject new service requests, or the reconfiguration of entities such as load balancers not to route new service requests to the VNF instance to be terminated. Such reconfiguration tasks are application-specific, i.e. they require knowledge about the internals of the application that is realized by the VNF.

In the management architecture shown in FIG. 1, there is a split of responsibilities. The VNF Manager 12 is responsible for the virtualization-specific aspects of the VNF 11, and the OSS (Operations Support System) 14 and EM (Element Manager) 15 are responsible for the application-specific management of the VNF 11. These entities need to be involved in the graceful termination of the VNF 11.

Hence, according to certain aspects of the present invention, the problem is solved where in VNF instance termination, application specific aspects have to be considered in addition to virtualization-specific aspects in order to avoid service degradation. Such type of termination is called "graceful termination". In order to manage graceful termination, virtualization-specific management entities and application-specific management entities need to interwork.

According to certain aspects of the present invention, there are described procedures how such interworking can be achieved based on the ETSI NFV architectural framework.

In the following, different scenarios are described where the termination of the VNF instance is initiated by the OSS, the NFVO or the EM.

Figure 2:
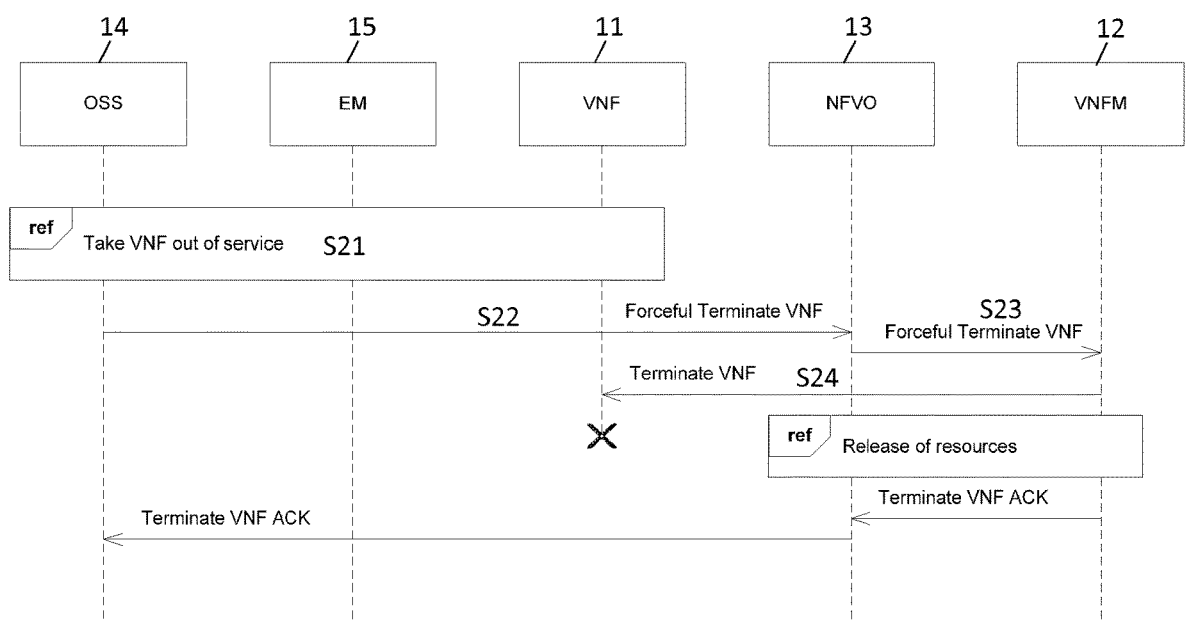
FIG. 2 is a flowchart illustrating an example according to prior art where the termination is initiated by the OSS.

Initiation by OSS:

FIG. 2 is a flowchart illustrating an example according to prior art where the termination is initiated by the OSS.

The OSS initiates the termination of the VNF instance towards the NFVO via the Os-Ma-nfvo reference point.

According to this known procedure, as illustrated in FIG. 2, the OSS 14 can take the appropriate measures itself to take the VNF 11 out of service (S21), and then request a forceful termination via Os-Ma-nfvo in step S22. That request will be passed via Or-Vnfm towards the VNFM 12 in step S23 which will just execute the termination in step S24, assuming the VNF instance has been taken out of service.

Figure 3:
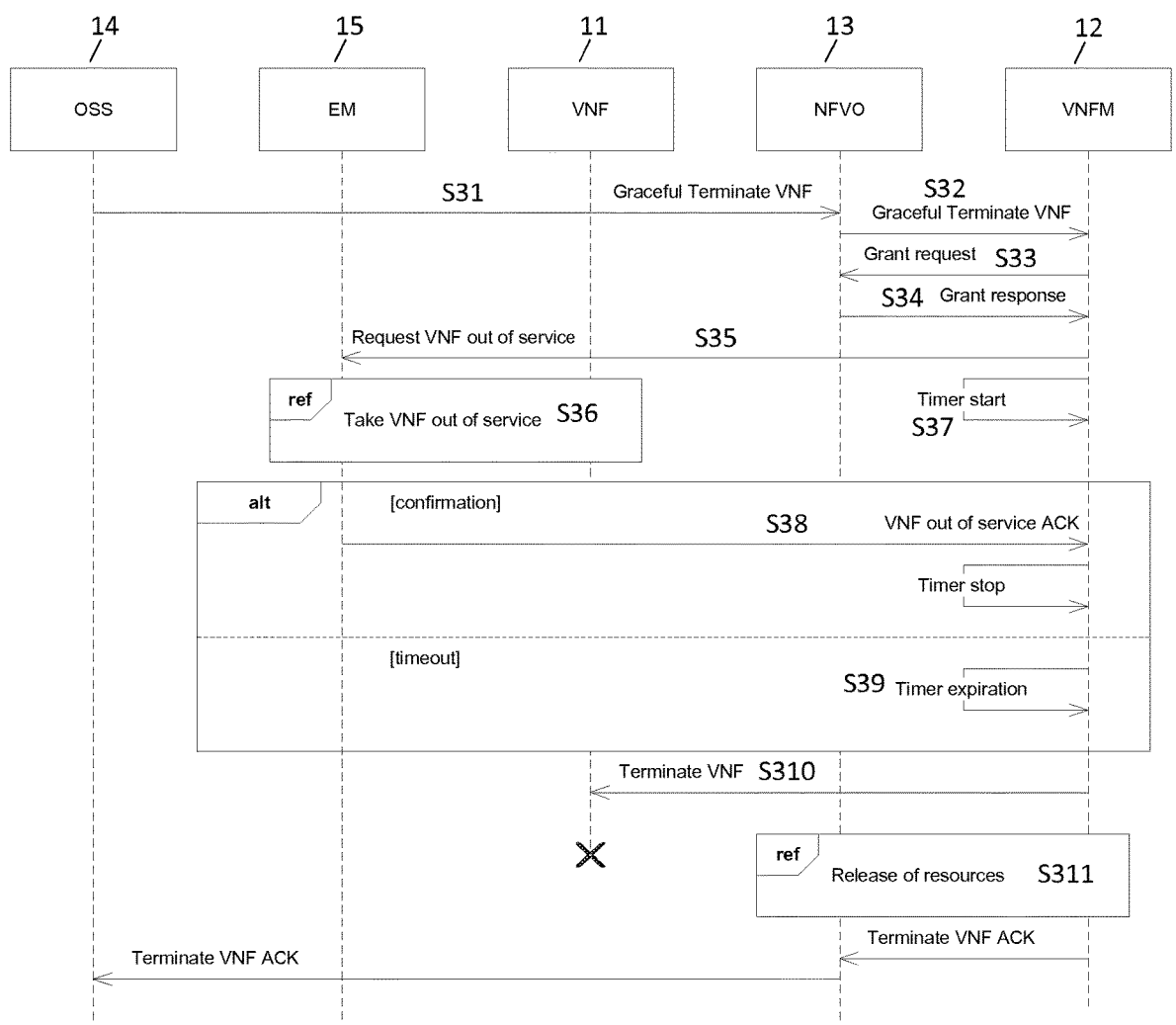
FIG. 3 is a flowchart illustrating another example where the termination is initiated by the OSS according to some example versions of the present invention.

FIG. 3 is a flowchart illustrating another example where the termination is initiated by the OSS.

According to certain aspects of the present invention, as illustrated in FIG. 3, the OSS 14 can request a graceful termination via Os-Ma-nfvo in step S31. That request will be passed via Or-Vnfm towards the VNFM 12 in step S32. Once the VNFM 12 receives the request in step S32, it may first ask the NFVO 13 for granting the request in step S33. If permission is granted (step S34), the VNFM 12 will ask the EM 15 on Ve-Vnfm-em to take the VNF 11 out of service. Here, it is noted that currently, steps S33 and S34 according to the grant request/response are mandatory to be executed. However, it is also possible that these steps are optional in the future for some reasons. For example, it may be optional when the termination request is initiated by the NFVO itself, i.e. initiated by the same entity that approves the granting. That is, it is noted that certain aspects of the present invention are applicable to both scenarios where the granting request/response is carried out or not carried out.

The EM 15 will take the necessary steps, possible communicating with the OSS 14, in order to take the VNF out of service (S36). It is noted that this taking out of service can mean some application layer reconfiguration of the VNF being terminated, any of the "neighbors" (VNFs/PNFs) and the reconfiguration of the network. (However, it is noted that the exact procedure for taking a VNF out of service is application specific and not part of this invention).

After that, the VNFM 12 may wait for a certain timer t for the EM to report success (S37). Once either success was reported (S38) or the timer is elapsed (S39), the VNFM 12 will proceed and forcefully terminate the VNF (S310), returning the resources used by the VNF to the system (S311).

Figure 4:
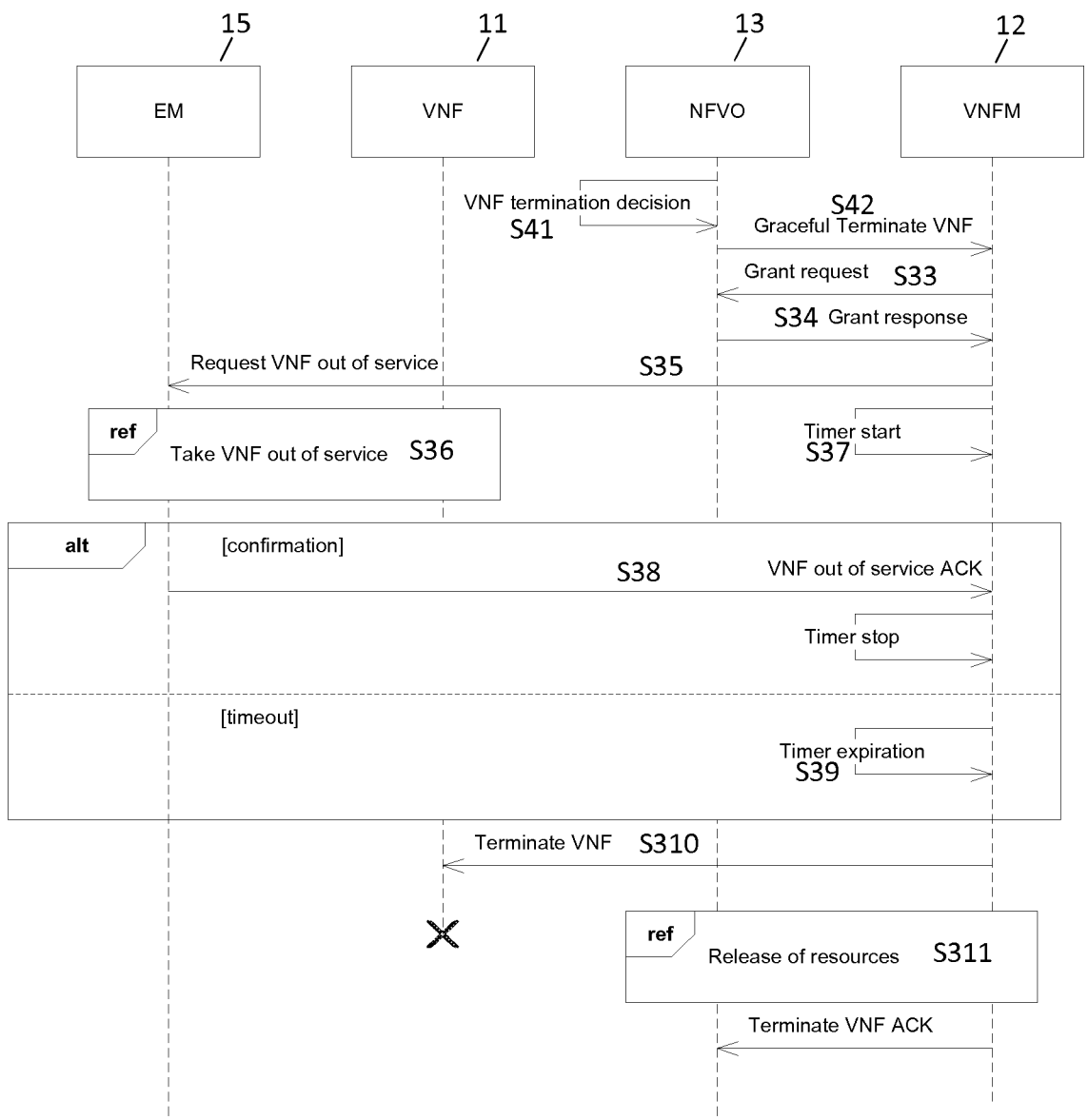
FIG. 4 is a flowchart illustrating an example where the termination is initiated by the NFVO according to some example versions of the present invention.

Initiation by NFVO:

FIG. 4 is a flowchart illustrating an example where the termination is initiated by the NFVO.

According to certain aspects of the present invention, as illustrated in FIG. 4, the NFVO 13 initiates the graceful termination of the VNF instance 11 towards the VNFM 13 via the Or-Vnfm reference point.

After the decision to terminate the VNF 11 (S41), the graceful termination request is forwarded to the VNFM 12 in step S42. Then, a similar procedure as described with respect to FIG. 3 will be effected. That is, once the VNFM 12 receives the request in step S42, it may first ask the NFVO 13 for granting the request in step S33. If permission is granted (step S34), the VNFM 12 will ask the EM 15 on Ve-Vnfm-em to take the VNF 11 out of service. The EM 15 will take the necessary steps, possible communicating with the OSS 14, in order to take the VNF out (S36). It is again noted that steps S33 and S34 may be optional, as already set out above with respect to FIG. 3.

After that, the VNFM 12 may wait for a certain timer t for the EM to report success (S37). Once either success was reported (S38) or the timer is elapsed (S39), the VNFM 12 will proceed and forcefully terminate the VNF (S310), returning the resources used by the VNF to the system (S311).

Figure 5:
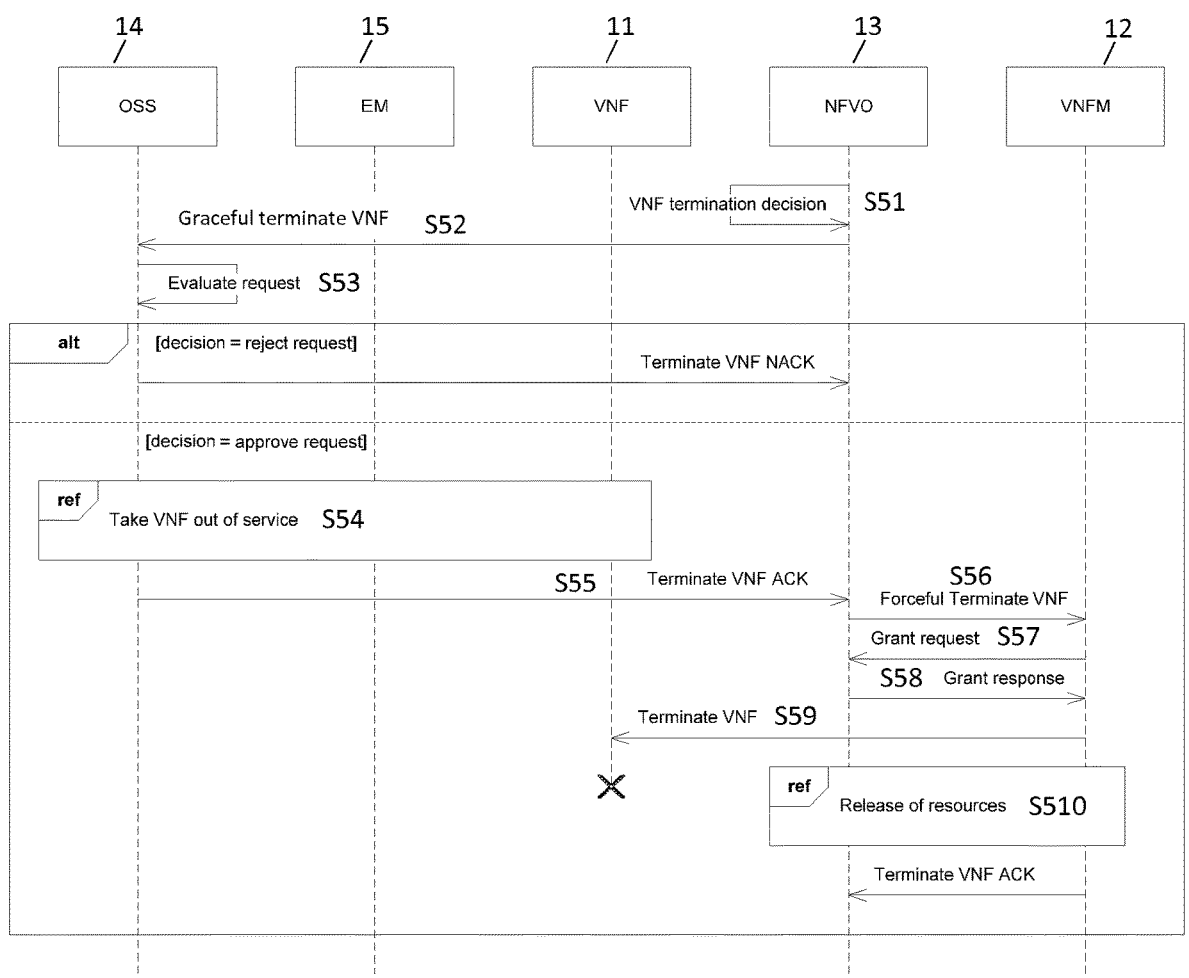
FIG. 5 is a flowchart illustrating another example where the termination is initiated by the NFVO according to some example versions of the present invention.

FIG. 5 is a flowchart illustrating another example where the termination is initiated by the NFVO.

According to a further example according to certain aspects of the present invention, as illustrated in FIG. 5, after the decision to terminate the VNF 11 (S51), the NFVO 13 initiates via Os-Ma-nfvo towards the OSS 14 the graceful termination of the VNF instance 11 (S52). The OSS 14 can evaluate the request (S53), and when the request is approved, can take the necessary steps to take the VNF out of service (S54), before passing control back to the NFVO by sending a Terminate VNF acknowledgement in step S55. It is noted that this approach also allows the OSS to execute some control on whether or not a VNF is to be terminated, i.e. it can reject a termination request e.g. based on policy. Once the VNF 11 has been taken out of service and control is passed back to the NFVO 13, the NFVO requests the forceful termination of the VNF instance towards the VNFM 12 via the Nfvo-Vnfm reference point (S56). The VNFM 12 may first ask the NFVO 13 for granting the request in step (S57). If permission is granted (step S58), the VNFM 12 will then execute the forceful termination (S59) and releases the resources used by the terminated VNF 11 (S510). Also in this case, steps S57 and S58 may be optional, as already set out above with respect to steps S33 and S34 in FIGS. 3 and 4.

Figure 6:
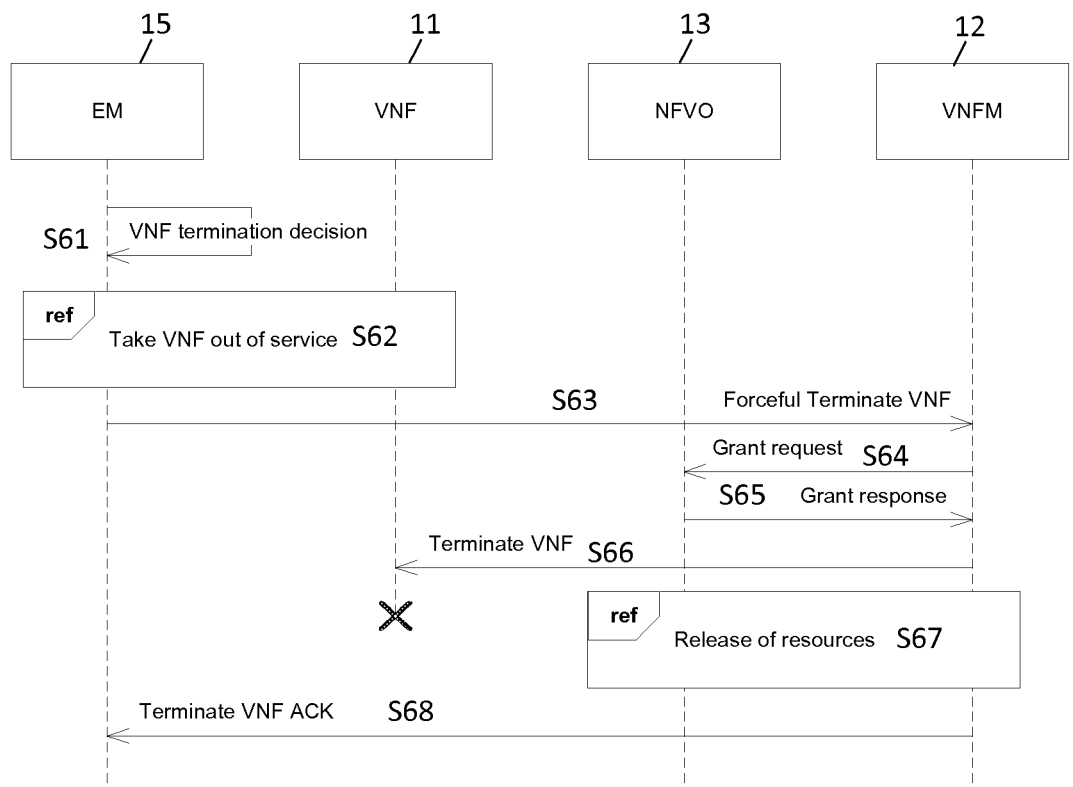
FIG. 6 is a flowchart illustrating an example where the termination is initiated by the EM according to some example versions of the present invention.

Initiation by EM:

FIG. 6 is a flowchart illustrating an example where the termination is initiated by the EM.

According to certain aspects of the present invention, the EM 15 initiates the termination of the VNF instance 11 towards the VNFM 12 via the Ve-Vnfm-em reference point.

According to certain aspects of the present invention, as illustrated in FIG. 6, the EM 15 can take the appropriate measures itself to take the VNF out of service (S61, S62), and then request a forceful termination via Ve-Vnfm-em towards the VNFM 12 in step S63. The VNFM 12 which will just execute the termination, assuming the VNF instance has been taken out of service. That is, the VNFM 12 will first ask the NFVO 13 for granting the request in step S64. If permission is granted (step S65), the VNFM 12 terminates the VNF (S66), releases the resources used by the VNF to the system (S67) and acknowledged the termination to the EM via Ve-Vnfm-em (S68).

Figure 7:
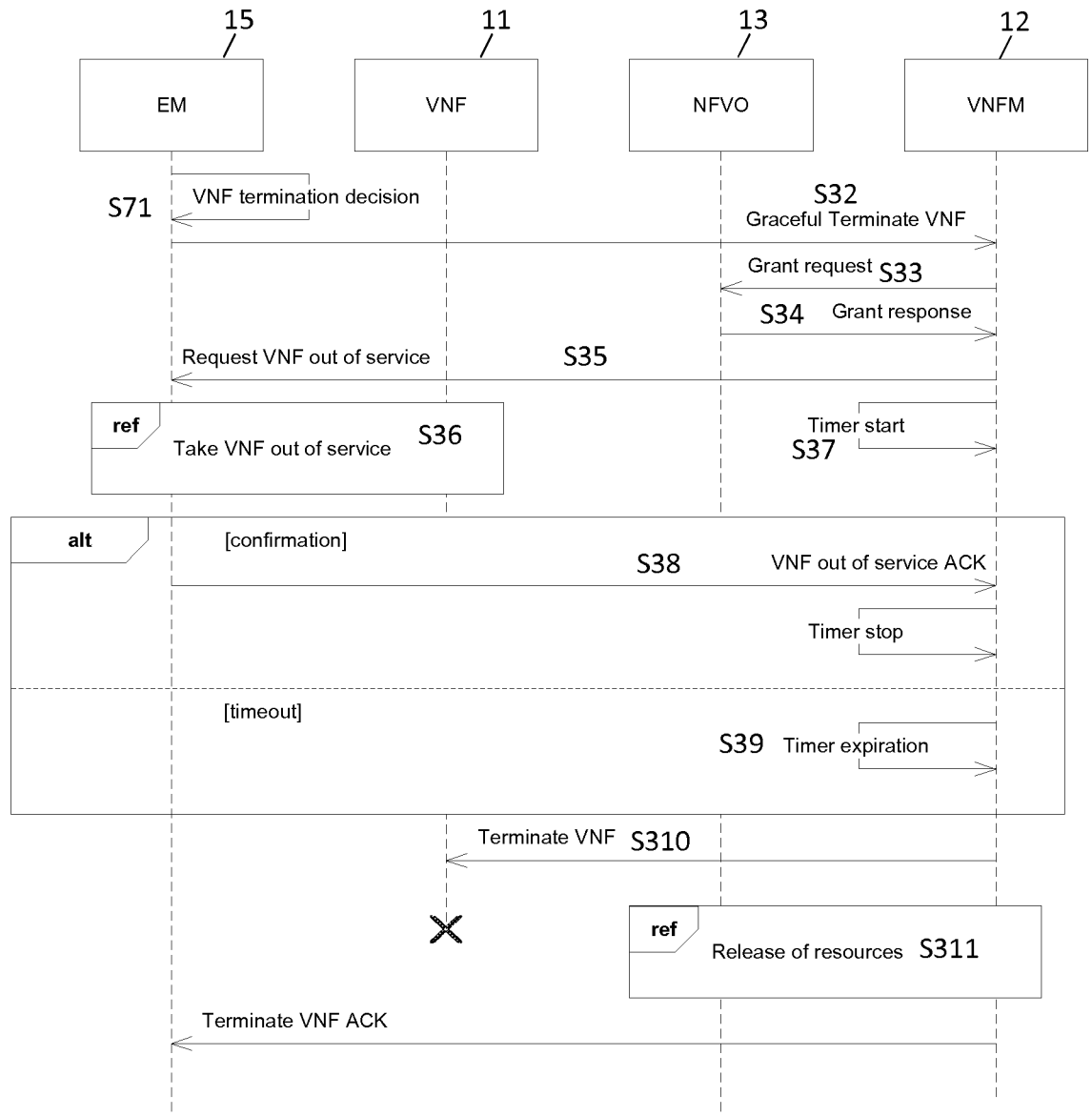
FIG. 7 is a flowchart illustrating another example where the termination is initiated by the EM according to some example versions of the present invention.

FIG. 7 is a flowchart illustrating another example where the termination is initiated by the EM.

Further, according to certain aspects of the present invention, as illustrated in FIG. 7, after deciding to terminate the VNF in step S71, the EM 15 can request a graceful termination via Ve-Vnfm-em towards the VNFM 12 which will interact with the EM to execute the graceful termination (S32 to S311), as already set out above (cf. FIG. 3). The advantage of this approach over the approach shown in FIG. 6 is that the VNFM can ask the NFVO for granting the request before any changes to the VNF instance are done.

In the following, a more general description of example versions of the present invention is made with respect to FIGS. 8 to 13.

Figure 8:
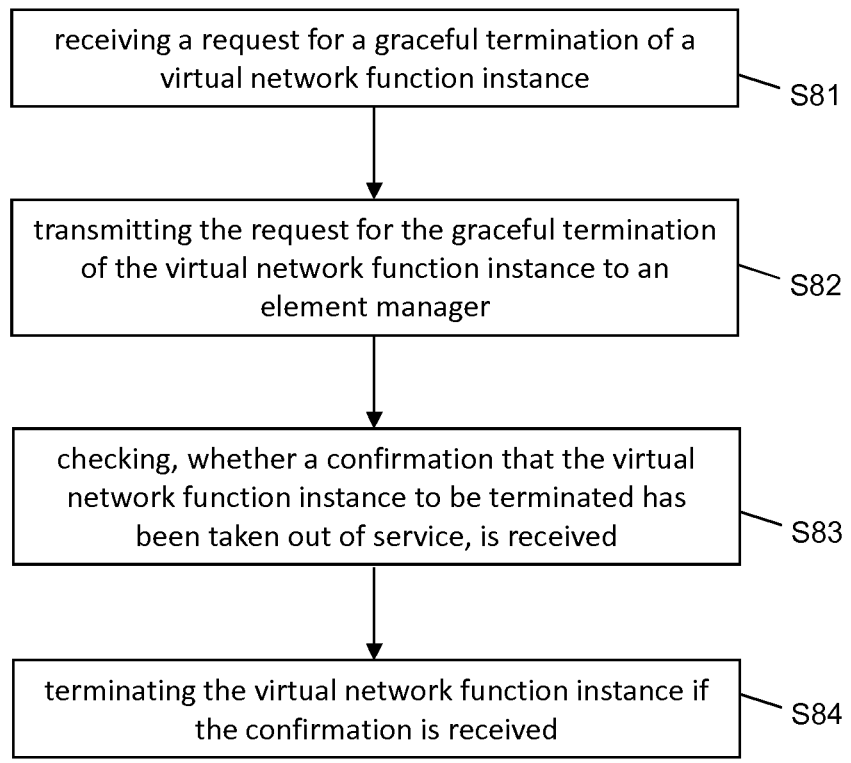
FIG. 8 is a flowchart illustrating an example of a method according to some example versions of the present invention.

FIG. 8 is a flowchart illustrating an example of a method according to some example versions of the present invention.

According to example versions of the present invention, the method may be implemented in or may be part of a virtual network function manager. The method comprises receiving a request for a graceful termination of a virtual network function instance in a step S81, transmitting the request for the graceful termination of the virtual network function instance to an element manager in a step S82, checking, whether a confirmation that the virtual network function instance to be terminated has been taken out of service, is received, in a step S83, and if the confirmation is received, terminating the virtual network function instance in a step S84.

According to some example versions of the present invention, if the confirmation is not received, the method further comprises checking whether a timer is expired, and if the timer is expired, terminating the virtual network function instance.

According to some example versions of the present invention, the method further comprises releasing the resources used by the terminated virtual network function instance.

According to some example versions of the present invention, the request for the graceful termination of the virtual network function instance is initiated by and received from the network functions virtualization orchestrator.

According to some example versions of the present invention, the request for the graceful termination of the virtual network function instance is initiated by an entity within operations support system and received via a network functions virtualization orchestrator.

According to some example versions of the present invention, the request for the graceful termination of the virtual network function instance is initiated by and received from an element manager.

Figure 9:
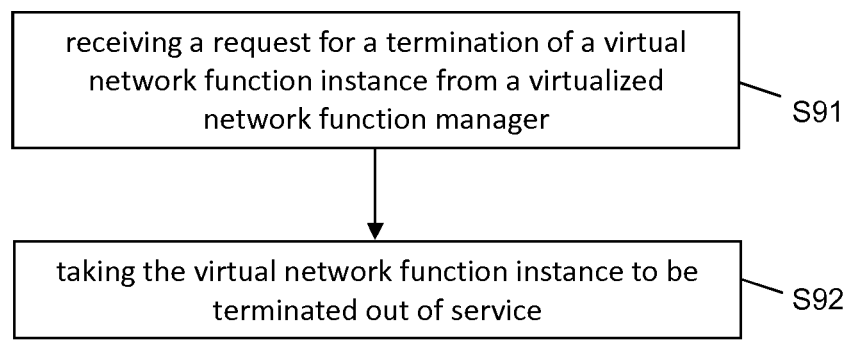
FIG. 9 is a flowchart illustrating another example of a method according to some example versions of the present invention.

FIG. 9 is a flowchart illustrating another example of a method according to some example versions of the present invention.

According to example versions of the present invention, the method may be implemented in or may be part of an element manager. The method comprises receiving a request for a termination of a virtual network function instance from a virtualized network function manager in a step S91, and taking the virtual network function instance to be terminated out of service in a step S92.

According to some example versions of the present invention, the method further comprises transmitting a confirmation that the virtual network function instance to be terminated has been taken out of service to the virtualized network function manager.

According to some example versions of the present invention, the request for the termination of the virtual network function instance is initiated by the element manager itself, and the request for the termination of the virtual network function instance is transmitted to the virtualized network function manager prior to receiving the request for the termination of the virtual network function instance.

Figure 10:
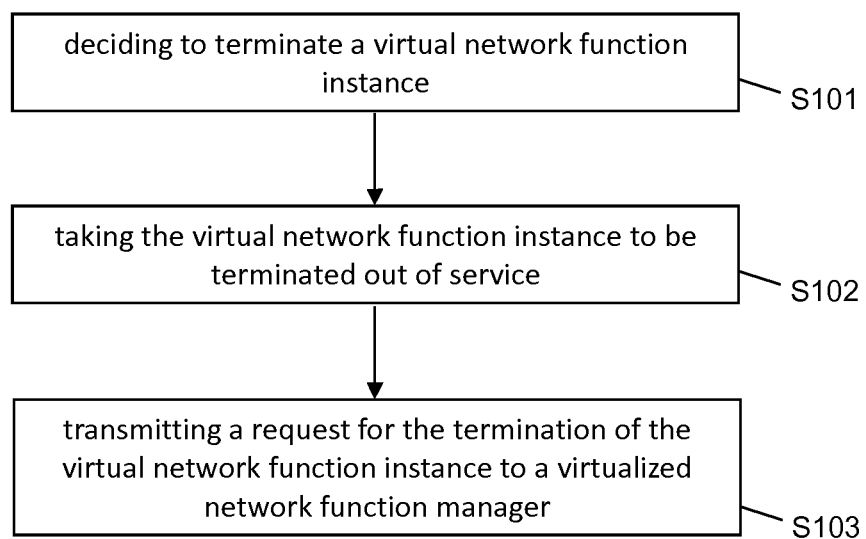
FIG. 10 is a flowchart illustrating another example of a method according to some example versions of the present invention.

FIG. 10 is a flowchart illustrating another example of a method according to some example versions of the present invention.

According to example versions of the present invention, the method may be implemented in or may be part of an element manager. The method comprises deciding to terminate a virtual network function instance in a step S100, taking the virtual network function instance to be terminated out of service in a step S101, and transmitting a request for the termination of the virtual network function instance to a virtualized network function manager in a step S102.

Figure 11:
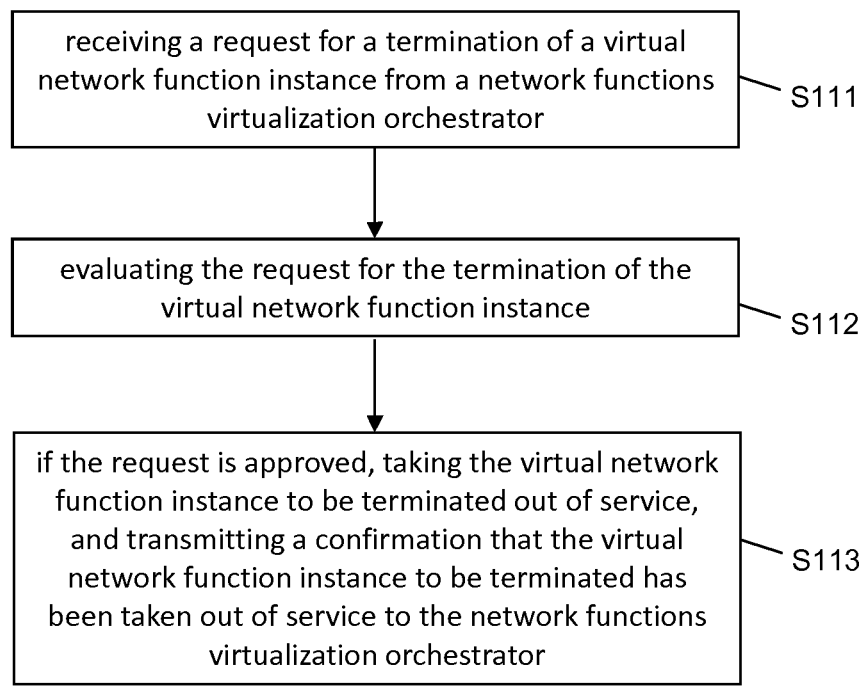
FIG. 11 is a flowchart illustrating another example of a method according to some example versions of the present invention.

FIG. 11 is a flowchart illustrating another example of a method according to some example versions of the present invention.

According to example versions of the present invention, the method may be implemented in or may be part of an entity within operations support system. The method comprises receiving a request for a termination of a virtual network function instance from a network functions virtualization orchestrator in a step S111, evaluating the request for the termination of the virtual network function instance in a step S112, and, if the request is approved, taking the virtual network function instance to be terminated out of service in a step S113, and transmitting a confirmation that the virtual network function instance to be terminated has been taken out of service to the network functions virtualization orchestrator in a step S114.

Figure 12:
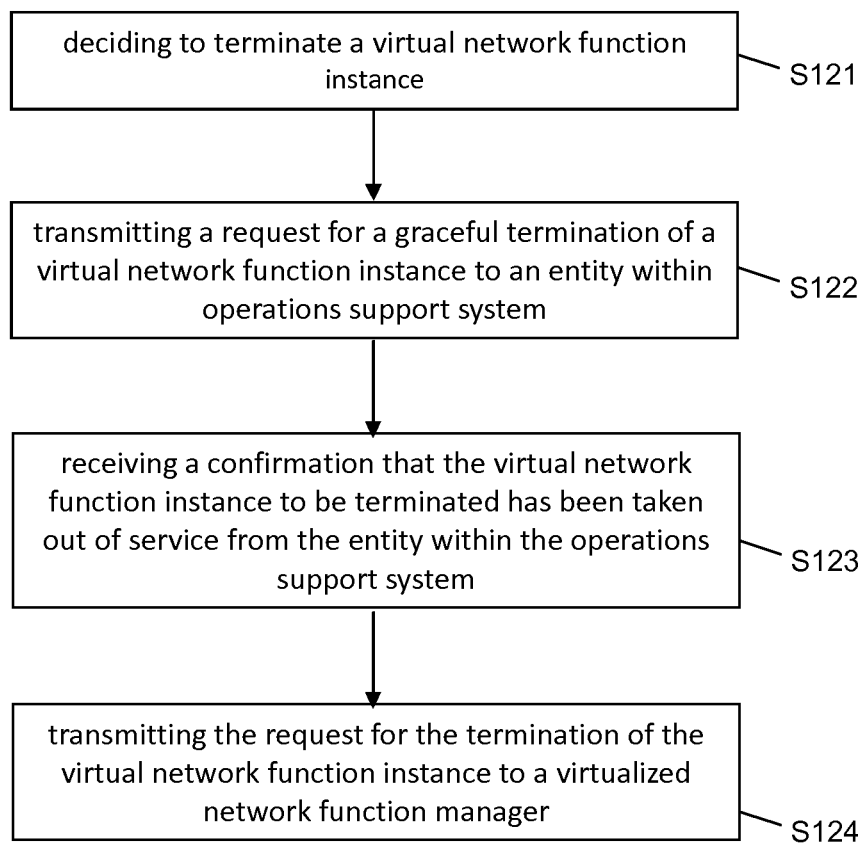
FIG. 12 is a flowchart illustrating another example of a method according to some example versions of the present invention.

FIG. 12 is a flowchart illustrating another example of a method according to some example versions of the present invention.

According to example versions of the present invention, the method may be implemented in or may be part of a network functions virtualization orchestrator. The method comprises deciding to terminate a virtual network function instance in a step S121, transmitting a request for a graceful termination of a virtual network function instance to an entity within operations support system in a step S122, receiving a confirmation that the virtual network function instance to be terminated has been taken out of service from the entity within the operations support system in a step S123, and transmitting the request for the termination of the virtual network function instance to a virtualized network function manager in a step S124.

Figure 13:
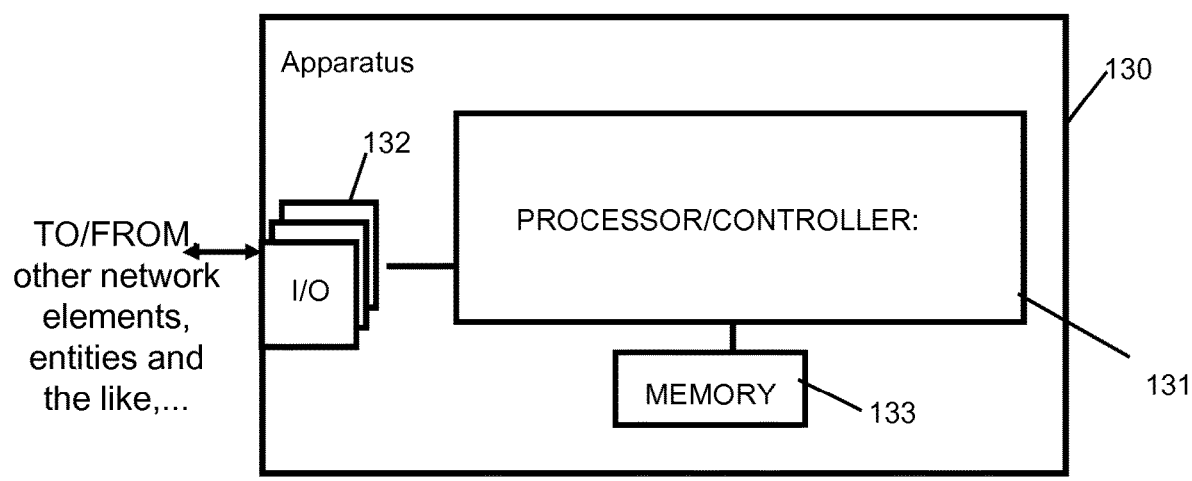
FIG. 13 is a block diagram illustrating an example of an apparatus according to some example versions of the present invention.

FIG. 13 is a block diagram illustrating an example of an apparatus according to some example versions of the present invention.

In FIG. 13, a block circuit diagram illustrating a configuration of an apparatus 130 is shown, which is configured to implement the above described aspects of the invention. It is to be noted that the apparatus 130 shown in FIG. 13 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 130 may comprise a processing function or processor 131, such as a CPU or the like, which executes instructions given by programs or the like. The processor 131 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 132 denotes transceiver or input/output (I/O) units (interfaces) connected to the processor 131. The I/O units 132 may be used for communicating with one or more other network elements, entities, terminals or the like. The I/O units 132 may be a combined unit comprising communication equipment towards several network elements, or may comprise a distributed structure with a plurality of different interfaces for different network elements. The apparatus 130 further comprises at least one memory 133 usable, for example, for storing data and programs to be executed by the processor 131 and/or as a working storage of the processor 131.

The processor 131 is configured to execute processing related to the above described aspects.

In particular, the apparatus 130 may be implemented in or may be part of a virtual network function manager or the like, and may be configured to perform a method as described in connection with FIG. 8. Thus, the processor 131 is configured to perform receiving a request for a graceful termination of a virtual network function instance, transmitting the request for the graceful termination of the virtual network function instance to an element manager, checking, whether a confirmation that the virtual network function instance to be terminated has been taken out of service, is received, and if the confirmation is received, terminating the virtual network function instance.

According to some example versions of the present invention, the apparatus 130 may be implemented in or may be part of an element manager or the like, and may be configured to perform a method as described in connection with FIG. 9. Thus, the processor 131 is configured to perform receiving a request for a termination of a virtual network function instance from a virtualized network function manager, taking the virtual network function instance to be terminated out of service.

According to some example versions of the present invention, the apparatus 130 may be implemented in or may be part of an element manager or the like, and may be configured to perform a method as described in connection with FIG. 10. Thus, the processor 131 is configured to perform deciding to terminate a virtual network function instance, taking the virtual network function instance to be terminated out of service, transmitting a request for the termination of the virtual network function instance to a virtualized network function manager.

According to some example versions of the present invention, the apparatus 130 may be implemented in or may be part of an entity within operations support system or the like, and may be configured to perform a method as described in connection with FIG. 11. Thus, the processor 131 is configured to perform receiving a request for a termination of a virtual network function instance from a network functions virtualization orchestrator, evaluating the request for the termination of the virtual network function instance, if the request is approved, taking the virtual network function instance to be terminated out of service, and transmitting a confirmation that the virtual network function instance to be terminated has been taken out of service to the network functions virtualization orchestrator.

According to some example versions of the present invention, the apparatus 130 may be implemented in or may be part of a network functions virtualization orchestrator or the like, and may be configured to perform a method as described in connection with FIG. 12. Thus, the processor 131 is configured to perform deciding to terminate a virtual network function instance, transmitting a request for a graceful termination of a virtual network function instance to an entity within operations support system, receiving a confirmation that the virtual network function instance to be terminated has been taken out of service from the entity within the operations support system, and transmitting the request for the termination of the virtual network function instance to a virtualized network function manager.

For further details regarding the functions of the apparatus 130, reference is made to the description of the methods according to some example versions of the present invention as described in connection with FIGS. 8 to 12.

Thus, it is noted that the apparatus for use in a virtual network function manager, the apparatus for use in an element manager, the apparatus for use in an entity within operations support system, and the apparatus for use in a network functions virtualization orchestrator, generally have the same structural components, wherein these components are configured to execute the respective functions of the network elements, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method for use in a virtual network function manager, comprising:
    receiving a request for a termination of a virtual network function instance based upon at least one application-specific aspect and at least one virtualization-specific aspect;
    transmitting the request for the termination of the virtual network function instance to an element manager via Ve-Vnfm-em;
    checking whether a confirmation that the virtual network function instance to be terminated has been taken out of service is received; and
    if the confirmation is received, terminating the virtual network function instance.

2. The method according to claim 1, further comprising:
    if the confirmation is not received, checking whether a timer is expired; and
    if the timer is expired, terminating the virtual network function instance.

3. The method according to claim 1, further comprising:
    releasing the resources used by the terminated virtual network function instance.

4. The method according to claim 1, wherein:
    the request for the termination of the virtual network function instance is initiated by and received from a network functions virtualization orchestrator.

5. The method according to claim 1, wherein:
    the request for the termination of the virtual network function instance is initiated by an entity within an operations support system and received via a network functions virtualization orchestrator.

6. The method according to claim 1, wherein:
    the request for the termination of the virtual network function instance is initiated by and received from an element manager.

7. A computer program product embodied on a non-transitory computer-readable medium, said product including software code portions for performing the method of claim 1 when the program is run on a processing device.

8. The computer program product according to claim 7, wherein the program is directly loadable into an internal memory of the processing device.

9. A method for use in an element manager, comprising:
    receiving a request for a termination of a virtual network function instance from a virtualized network function manager via Ve-Vnfm-em based upon at least one application-specific aspect and at least one virtualization-specific aspect; and
    taking the virtual network function instance to be terminated out of service.

10. The method according to claim 9, further comprising:
    transmitting a confirmation that the virtual network function instance to be terminated has been taken out of service to the virtualized network function manager.

11. The method according to claim 9, wherein:
    the request for the termination of the virtual network function instance is initiated by the element manager itself, and the request for the termination of the virtual network function instance is transmitted to the virtualized network function manager prior to receiving the request for the termination of the virtual network function instance.

12. A method for use in an element manager, comprising:
    deciding to terminate a virtual network function instance based upon at least one application-specific aspect and at least one virtualization-specific aspect;
    taking the virtual network function instance to be terminated out of service; and
    transmitting a request for the termination of the virtual network function instance to a virtualized network function manager via Ve-Vnfm-em.

13. A method for use in an entity within an operations support system, comprising:
    receiving a request for a termination of a virtual network function instance from a network functions virtualization orchestrator via Os-Ma-nfvo based upon at least one application-specific aspect and at least one virtualization-specific aspect;
    evaluating the request for the termination of the virtual network function instance;
    if the request is approved, taking the virtual network function instance to be terminated out of service; and
    transmitting a confirmation that the virtual network function instance to be terminated has been taken out of service to the network functions virtualization orchestrator.

14. A method for use in a network functions virtualization orchestrator, comprising:

deciding to terminate a virtual network function instance based upon at least one application-specific aspect and at least one virtualization-specific aspect;
transmitting a request for a termination of a virtual network function instance to an entity within an operations support system via os-ma-nfvo;
receiving a confirmation that the virtual network function instance to be terminated has been taken out of service from the entity within the operations support system via os-ma-nfvo; and
transmitting the request for the termination of the virtual network function instance to a virtualized network function manager.

15. An apparatus for use in a virtual network function manager, comprising:
   at least one processor; and
   at least one memory for storing instructions to be executed by the processor;
   wherein the at least one memory and the instructions are configured to, with the at least one processor, cause the apparatus at least to perform:
   receiving a request for a termination of a virtual network function instance based upon at least one application-specific aspect and at least one virtualization-specific aspect;
   transmitting the request for the termination of the virtual network function instance to an element manager via Ve-Vnfm-em;
   checking, whether a confirmation that the virtual network function instance to be terminated has been taken out of service, is received; and
   if the confirmation is received, terminating the virtual network function instance.

16. An apparatus for use in an element manager, comprising:
   at least one processor; and
   at least one memory for storing instructions to be executed by the processor;
   wherein the at least one memory and the instructions are configured to, with the at least one processor, cause the apparatus at least to perform:
   receiving a request for a termination of a virtual network function instance from a virtualized network function manager via Ve-Vnfm-em based upon at least one application-specific aspect and at least one virtualization-specific aspect; and
   taking the virtual network function instance to be terminated out of service.

17. An apparatus for use in an element manager, comprising:
   at least one processor; and
   at least one memory for storing instructions to be executed by the processor;
   wherein the at least one memory and the instructions are configured to, with the at least one processor, cause the apparatus at least to perform:
   deciding to terminate a virtual network function instance based upon at least one application-specific aspect and at least one virtualization-specific aspect;
   taking the virtual network function instance to be terminated out of service;
   transmitting a request for the termination of the virtual network function instance to a virtualized network function manager via Ve-Vnfm-em.

18. An apparatus for use in an entity within an operations support system, comprising:
   at least one processor; and
   at least one memory for storing instructions to be executed by the processor;
   wherein the at least one memory and the instructions are configured to, with the at least one processor, cause the apparatus at least to perform:
   receiving a request for a termination of a virtual network function instance from a network functions virtualization orchestrator via Os-Ma-nfvo based upon at least one application-specific aspect and at least one virtualization-specific aspect;
   evaluating the request for the termination of the virtual network function instance;
   if the request is approved, taking the virtual network function instance to be terminated out of service; and
   transmitting a confirmation that the virtual network function instance to be terminated has been taken out of service to the network functions virtualization orchestrator.

19. An apparatus for use in a network functions virtualization orchestrator, comprising:
   at least one processor; and
   at least one memory for storing instructions to be executed by the processor;
   wherein the at least one memory and the instructions are configured to, with the at least one processor, cause the apparatus at least to perform:
   deciding to terminate a virtual network function instance based upon at least one application-specific aspect and at least one virtualization-specific aspect;
   transmitting a request for a termination of a virtual network function instance to an entity within an operations support system via os-ma-nfvo;
   receiving a confirmation that the virtual network function instance to be terminated has been taken out of service from the entity within the operations support system; and
   transmitting the request for the termination of the virtual network function instance to a virtualized network function manager.

* * * * *